US012632996B2

(12) United States Patent
Luo et al.

(10) Patent No.: US 12,632,996 B2
(45) Date of Patent: May 19, 2026

(54) GENERATING QUANTIZATION TABLES FOR IMAGE COMPRESSION

(71) Applicant: Google LLC, Mountain View, CA (US)

(72) Inventors: Xiyang Luo, Mountain View, CA (US); Feng Yang, Sunnyvale, CA (US); Hossein Talebi, San Jose, CA (US)

(73) Assignee: Google LLC, Mountain View, CA (US)

( * ) Notice: Subject to any disclaimer, the term of this patent is extended or adjusted under 35 U.S.C. 154(b) by 816 days.

(21) Appl. No.: 17/918,170

(22) PCT Filed: Apr. 17, 2020

(86) PCT No.: PCT/US2020/028864
§ 371 (c)(1),
(2) Date: Oct. 11, 2022

(87) PCT Pub. No.: WO2021/211140
PCT Pub. Date: Oct. 21, 2021

(65) Prior Publication Data
US 2023/0130410 A1     Apr. 27, 2023

(51) Int. Cl.
G06T 9/00          (2006.01)
G06T 3/4046      (2024.01)

(52) U.S. Cl.
CPC ............ G06T 9/002 (2013.01); G06T 3/4046 (2013.01)

(58) Field of Classification Search
CPC ..... G06T 9/002; G06T 3/4046; H04N 19/124; H04N 19/126; H04N 19/147;
(Continued)

(56) References Cited

U.S. PATENT DOCUMENTS 4,903,317 A * 2/1990 Nishihara .............. H04N 19/94
                                                                      358/1.9
10,560,696 B2     2/2020 Gao et al.
(Continued)

FOREIGN PATENT DOCUMENTS

CN          109325595          2/2019
EP            3732881 B1 *   7/2025  ............. H04N 19/85
JP          H01151843 U * 10/1989

OTHER PUBLICATIONS

Luo, Xiyang, et al. "The rate-distortion-accuracy tradeoff: Jpeg case study." arXiv preprint arXiv:2008.00605 (2020). (Year: 2020).*
(Continued)

*Primary Examiner* — Charles T Shedrick
(74) *Attorney, Agent, or Firm* — Fish & Richardson P.C.

(57)          ABSTRACT

Methods, systems, and computer programs encoded on a computer storage medium, that relate to generating quantization tables that are used during digital image compression of a digital image. Multiple training images are obtained. A model can be trained using the training images to generate a quantization table that can be used during encoding of an input image. For each training image, a quantization table can be obtained using the model. Using the quantization table, an encoded digital image is obtained for the training image. Using the encoded digital image and the training image, an image quality loss and a compression loss can be determined. An overall loss of the model can be determined by combining the image quality loss and the compression loss for the training image. The model can be updated based on the overall loss.

11 Claims, 5 Drawing Sheets

(58) Field of Classification Search
CPC .. H04N 19/149; H04N 19/154; H04N 19/172; H04N 19/197
See application file for complete search history.

(56) References Cited

U.S. PATENT DOCUMENTS

| | | | | |
|---|---|---|---|---|
| 11,689,713 B2 * | 6/2023 | Jiang | ...................... | H04N 19/54 375/240.12 |
| 2018/0152709 A1 * | 5/2018 | Lay | ...................... | H04N 19/172 |
| 2019/0026555 A1 | 1/2019 | Cabral et al. | | |
| 2019/0141353 A1 * | 5/2019 | Michelini | ............ | H04N 19/172 |
| 2020/0090313 A1 * | 3/2020 | Bugdary | ................... | G06T 5/92 |
| 2020/0145662 A1 * | 5/2020 | Park | ...................... | G06N 3/0464 |
| 2023/0028426 A1 * | 1/2023 | Nadeem | ............... | H04N 19/176 |
| 2025/0086843 A1 * | 3/2025 | Zafar | ................... | G06N 3/0464 |

OTHER PUBLICATIONS

Hopkins et al., "Simulated Annealing for JPEG Quantization," CoRR, Submitted on Sep. 3, 2017, arXiv:1709.00649v1, 11 pages.

Office Action in European Appln. No. 20725286.7, mailed on Sep. 10, 2024, 7 pages.

Ahmadi et al., "Redmark: Framework for residual diffusion watermarking on deep networks" Submitted on Dec. 2018, arXiv:1810.07248, 33 pages.

Alam et al., "A perceptual quantization strategy for HEVC based on a convolutional neural network trained on natural images," Proceedings of the SPIE, Sep. 22, 2015, 9599:1-14.

Aoudia et al., "Model-free training of end-to-end communication systems." Submitted on Jul. 2019, arXiv:1812.05929v3, 14 pages.

Arjovsky et al., "Wasserstein gan" Submitted on Dec. 2017, arXiv:1701.07875v3, 32 pages.

Athalye et al., "Obfuscated gradients give a false sense of security: Circumventing defenses to adversarial examples" Submitted on Jul. 2018, arXiv:1802.00420v4, 12 pages.

Balle et al., "End-to-end optimized image compression," Submitted on Mar. 2017, arXiv:1611.01704v3, 27 pages.

Balle, "Efficient nonlinear transforms for lossy image compression," Submitted on Jul. 2018, arXiv:1802.00847v2, 6 pages.

Baluja et al., "Adversarial transformation networks: Learning to generate adversarial examples" Submitted on Mar. 2017, arXiv:1703.09387v1, 13 pages.

Bender et al., "Techniques for data hiding" IBM systems journal, 1996;35(3.4):313-336.

Choi et al., "Neural joint source-channel coding" Submitted on May 2019, arXiv:1811.07557v3, 15 pages.

Cox et al., Digital watermarking, Springer, vol. 53, 2002, 570 pages.

Fritschek et al., "Deep learning for channel coding via neural mutual information estimation" Submitted on Mar. 2019, arXiv:1903.02865v1, 5 pages.

Github.com [online], "tensorflow/compression," Mar. 14, 2019, retrieved on Dec. 19, 2019, retrieved from URL<https://github.com/tensorflow/compression>, 8 pages.

Goodfellow et al., "Explaining and harnessing adversarial examples" Submitted on Mar. 2015, arXiv:1412.6572v3, 11 pages.

Hamidi et al., "A blind robust image watermarking approach exploiting the dft magnitude" Submitted on Oct. 2019, arXiv:1910.11185v1, 6 pages.

Hosseini et al., "Blocking transferability of adversarial examples in black-box learning systems" Submitted on Mar. 2017, arXiv:1703.04318v1, 11 pages.

International Preliminary Report on Patentability in International Appln. No. PCT/US2020/028864, mailed on Oct. 27, 2022, 9 pages.

International Search Report and Written Opinion International Appln. No. PCT/US2020/028864, mailed on Aug. 26, 2020, 16 pages.

Jiansheng et al., "A digital watermarking algorithm based on dct and dwt" In Proceedings The 2009 International Symposium on Web Information Systems and Applications (WISA 2009), 104-107.

Kim et al., "Digital watermarking" 7th International Workshop, IWDW 2008, Busan, Korea, Nov. 10-12, 2008, 481 pages.

Kundur et al., "Digital watermarking using multiresolution wavelet decomposition." In Proceedings of the 1998 IEEE International Conference on Acoustics, Speech and Signal Processing, ICASSP'98 (Cat. No. 98CH36181), vol. 5, May 1998, 4 pages.

Kurakin et al., "Adversarial machine learning at scale" Submitted on Feb. 2017, arXiv:1611.01236, 17 pages.

Lee et al., "Generative adversarial trainer: Defense to adversarial perturbations with gan" Submitted on May 2017, arXiv:1705.03387v2, 9 pages.

Lin et al., "Microsoft coco: Common objects in context" Submitted on Feb. 2015, arXiv:1405.0312v3, 15 pages.

Luo et al., "Distortion agnostic deep watermarking." Proceedings of the IEEE/CVF conference on computer vision and pattern recognition, 2020, 13548-13557.

Maddison et al., "The concrete distribution: A continuous relaxation of discrete random variables" Submitted on Mar. 2017, arXiv:1611.00712, 20 pages.

Marzuki et al., "Perceptual Adaptive Quantization Parameter Selection Using Deep Convolutional Features for HEVC Encoder," IEEE Access, Feb. 24, 2020:8:37052-37065.

Morkel et al., "An overview of image steganography." ISSA. Vol. 1. No. 2. Jun. 2005, 12 pages.

Mun et al., "A robust blind watermarking using convolutional neural network" Submitted on Apr. 2017, arXiv:1704.03248, 5 pages.

O'Ruanaidh et al., "Rotation, scale and translation invariant digital image watermarking" In Proceedings of International Conference on Image Processing, vol. 1, Oct. 1997, 536-539.

Papernot et al., "Practical black-box attacks against machine learning" In Proceedings of the 2017 ACM on Asia conference on computer and communications security, Apr. 2017, 506-519.

Prabhishek Singh and RS Chadha. A survey of digital watermarking techniques, applications and attacks. International Journal of Engineering and Innovative Technology (IJEIT), Mar. 2013:2(9):165-175.

Ryan, "An introduction to LDPC codes." CRC Handbook for Coding and Signal Processing for Recording Systems 5.2, Sep. 2004, 23 pages.

Shafahi et al., "Adversarial training for free!" Submitted on Nov. 2019, arXiv:1904.12843, 12 pages.

Shin et al., "Jpeg-resistant adversarial images" In NIPS 2017 Workshop on Machine Learning and Computer Security, vol. 1, Dec. 2017, 6 pages.

Sklar, "A primer on turbo code concepts" IEEE communications Magazine, Dec. 1997:35(12):94-102.

Szegedy et al., "Intriguing properties of neural networks" Submitted on Feb. 2014, arXiv:1312.6199, 10 pages.

Tanaka et al., "Embedding secret information into a dithered multi-level image." IEEE Military Communications Conference. vol. 1, Sep. 1990, 216-220.

Tancik et al., "Stegastamp: Invisible hyperlinks in physical photographs" Submitted on Mar. 2020, arXiv:1904.05343, 13 pages.

Trifonov, "Efficient design and decoding of polar codes" IEEE transactions on communications 60.11, Aug. 2012, 7 pages.

Watson, "Perceptual Optimization of DCT Color Quantization Matrices" IEEE International Conference on Image Processing, Nov. 1994, 5 pages.

Wen et al., "Romark: A robust watermarking system using adversarial training" Submitted on Oct. 2019, arXiv:1910.01221, 5 pages.

Wengrowski et al., "Light field messaging with deep photographic steganography." Proceedings of the IEEE/CVF conference on computer vision and pattern recognition, 2019, 1515-1524.

Xie et al., "Mitigating adversarial effects through randomization" Submitted on Feb. 2018, arXiv:1711.01991v3, 16 pages.

Zhang et al., "A long-short term memory neural network based rate control method for video coding," Video and Image Processing, Dec. 29, 2018, 155-160.

Zhang et al., "Steganogan: Pushing the limits of image steganography" Submitted on Jan. 2019, arXiv:1901.03892, 11 pages.

(56)     References Cited

OTHER PUBLICATIONS

Zhu et al., "Hidden: Hiding data with deep networks" In Proceedings of the European Conference on Computer Vision (ECCV), 2018, 16 pages.

* cited by examiner

GENERATING QUANTIZATION TABLES FOR IMAGE COMPRESSION

CROSS-REFERENCE TO RELATED APPLICATIONS

This application is a National Stage Application under 35 U.S.C. § 371 and claims the benefit of International Application No. PCT/US2020/028864, filed Apr. 17, 2020, the entirety of which is incorporated herein by reference.

BACKGROUND

This specification generally relates to generating quantization tables that are used during digital image compression of digital images.

Digital image compression decreases the storage size of digital images, which can be useful when storing or transmitting digital images. JPEG compression is one such digital compression technique used in compressing digital images. In general, JPEG compression is a lossy compression standard that trades off image quality for image size. Thus, for a digital image, as the amount of JPEG compression (or other appropriate lossy compression) increases (i.e., by reducing the image file size, which is also referred to as rate), the image quality decreases (e.g., distortion in the image increases). This trade-off is referred to as rate-distortion trade-off. An additional consideration in image compression (including in JPEG compression) is the tradeoff between the amount of compression and the accuracy of the image classification/recognition, e.g., as determined by an image classifier. Thus, for a digital image, as the amount of JPEG compression increases, the accuracy of the image classification decreases. This is referred to as the rate-accuracy trade off. Together, these two trade-offs are referred to as the rate-distortion-accuracy tradeoff.

SUMMARY

In general, one innovative aspect of the subject matter described in this specification can be embodied in methods that can include the operations of obtaining a plurality of training images; training a model to generate a quantization table for encoding an input image, wherein the training includes: for each training image in the plurality of training images: obtaining, using the model, a quantization table for encoding the training image; generating, using the quantization table and for the training image, an encoded digital image; determining (1) an image quality loss based on pixel values of the encoded digital image and pixel values of the training image and (2) a compression loss that estimates a reduction in size of the encoded digital image relative to the training image; determining an overall loss of the model by combining the image quality loss and the compression loss for the training image; and updating the model based on the overall loss. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the plurality of training images can be one set of training images in a plurality of sets of training images; and training the model can include training the model to generate a quantization table that can be used during encoding of an input set of images.

In some implementations, training the model can include generating, using the current quantization table and for the training image, an encoded digital image; determining (1) an image quality loss based on pixel values of the encoded digital image and pixel values of the training image and (2) a compression loss that estimates a reduction in size of the encoded digital image relative to the training image; determining an overall loss of the model based on the image quality loss and the compression loss for all the training images in the set of training images; and updating, by the model and based on the overall loss, the current quantization table.

In some implementations, methods can include the operations of obtaining, after completing the training of the model, the current quantization table for JPEG encoding of an input set of images.

In some implementations, methods can include the operations of obtaining an input image; inputting the input image into the model; obtaining, from the model and based on the input image, a quantization table for JPEG encoding of the input image; and generating, using the obtained quantization table, a JPEG encoded image corresponding to the input image.

Another innovative aspect of the subject matter described in this specification can be embodied in methods that can include the operations of obtaining a plurality of sets of training images; training a model to generate a quantization table for encoding an input set of images, wherein the training includes: obtaining a current quantization table; for each set of training images in the plurality of sets of training images: for each training image in the set of training images: generating, using the quantization table and for the training image, an encoded digital image; determining (1) an image quality loss based on pixel values of the encoded digital image and pixel values of the training image and (2) a compression loss that estimates a reduction in size of the encoded digital image relative to the training image; determining an overall loss of the model based on the image quality loss and the compression loss for all the training images in the set of training images; and updating, by the model and based on the overall loss, the current quantization table; and obtaining, after completing the training of the model, the current quantization table for encoding an input set of images. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, methods can include the operations of determining an image classification loss based on a predicted classification of the encoded digital image and the actual classification of the training image.

In some implementations, determining the overall loss of the model based on the image quality loss and the compression loss for all the training images in the set of training images can include determining the overall loss of the model based on the image quality loss, the compression loss, and the image classification loss for all the training images in the set of training images.

In some implementations, determining the image quality loss based on pixel values of the encoded digital image and pixel values of the training image can include determining a loss based on a difference between the pixel values of the encoded digital image and the pixel values of the training image; and determining the compression loss of the model can be performed by a neural network entropy estimator that operates on quantized DCT coefficients of the encoded digital image.

In some implementations, methods can include the operations of obtaining a set of digital images; and generating, using the current quantization table obtained upon completion of training of the machine learning model, a set of JPEG encoded images corresponding to the set of digital images.

Particular embodiments of the subject matter described in this specification can be implemented to realize one or more of the following advantages. The techniques described in this specification can be used to compress digital images such that the resulting encoded digital images minimize a loss in the image quality (relative to the original images and with respect to quantization tables used in the compression) and/or maintain the same or similar image classification as the original images. In comparison, conventional techniques that compress digital images are generally unable to minimize the loss in the image quality to the same extent as the techniques described in this specification and/or maintain the same or similar image classification as the original images, to the same extent as the techniques described in this specification. In some conventional techniques, this may be because those conventional techniques do not use a differentiable JPEG function, which in turn prevents use of continuous optimization methods. In contrast, the techniques described in this specification utilize (1) a differentiable compression function (e.g., a differentiable JPEG function), which enables use of continuation optimization methods, and (2) a differentiable compression loss (also referred to as "compressibility loss"), which allows for joint optimization of file size, image quality, and/or classification accuracy. As used in this specification, optimization (or the act of optimizing) refers to improving a value of a parameter or variable relative to a reference value (which can, but need not, result in achieving a maximum value or the best value for the parameter or variable).

In addition, the techniques described in this specification enable optimizing a quantization table for a large scale image dataset. Moreover, if the techniques described in this specification are used to learn an optimized quantization table, the resulting quantization table is then available, at inference time, for use in image compression at no cost (i.e., a new quantization table does not need to be generated for use during image compression of the image data).

Further still, the techniques described in this specification enable addition of any perceptual loss function during training of the model such that a quantization table could be learned to optimize different low-level or high-level vision tasks, such as, e.g., image classification, object detection, and segmentation.

The details of one or more embodiments of the subject matter described in this specification are set forth in the accompanying drawings and the description below. Other features, aspects, and advantages of the subject matter will become apparent from the description, the drawings, and the claims.

4

Figure 3:
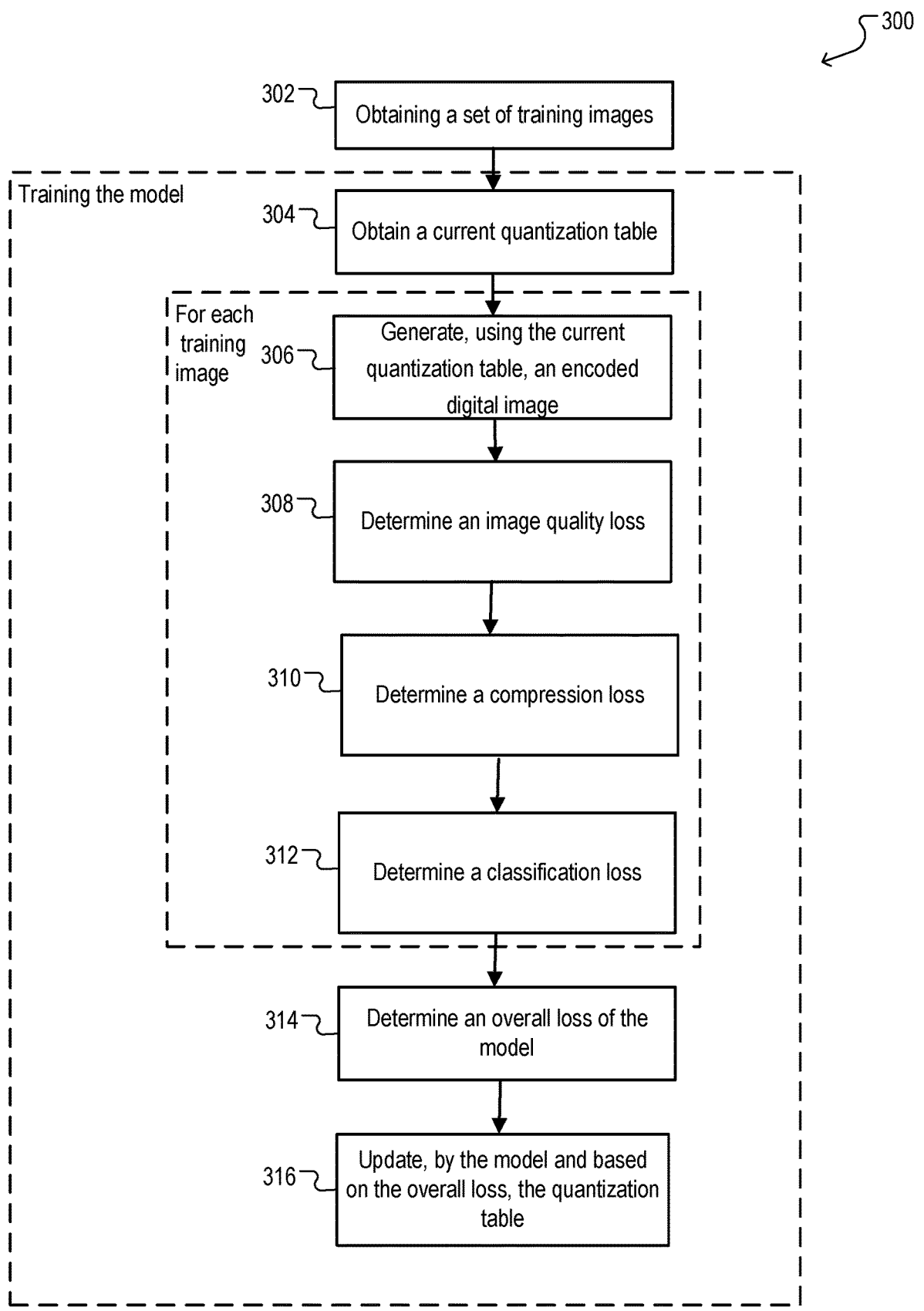

FIG. 3 is a flow diagram of an example process for training a model to generate quantization tables to be used during digital image compression of a set of digital images.

Figure 4:
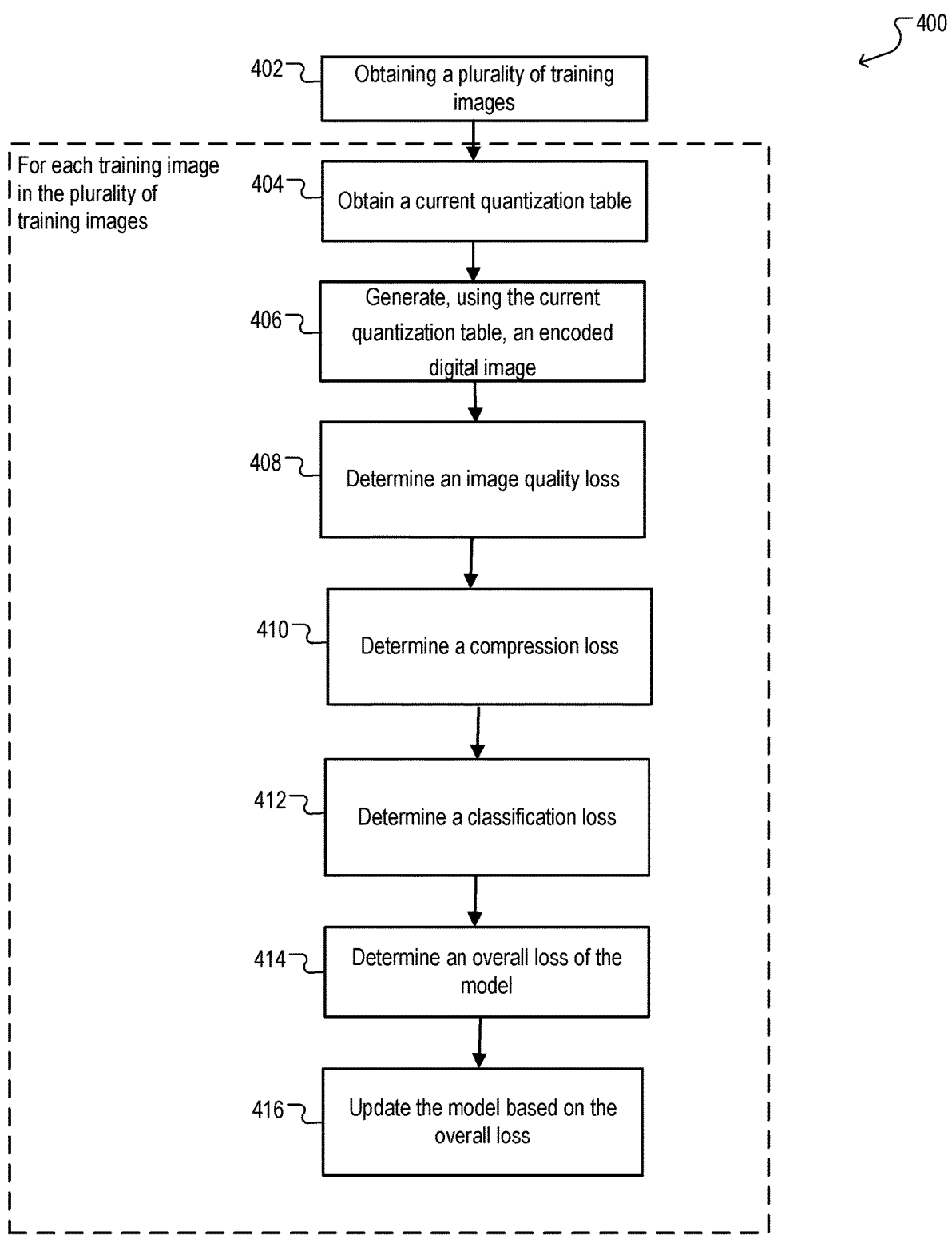

FIG. 4 is a flow diagram of an example process for training a model to generate quantization tables to be used during digital image compression of a particular digital image.

Figure 5:
Figure 5:
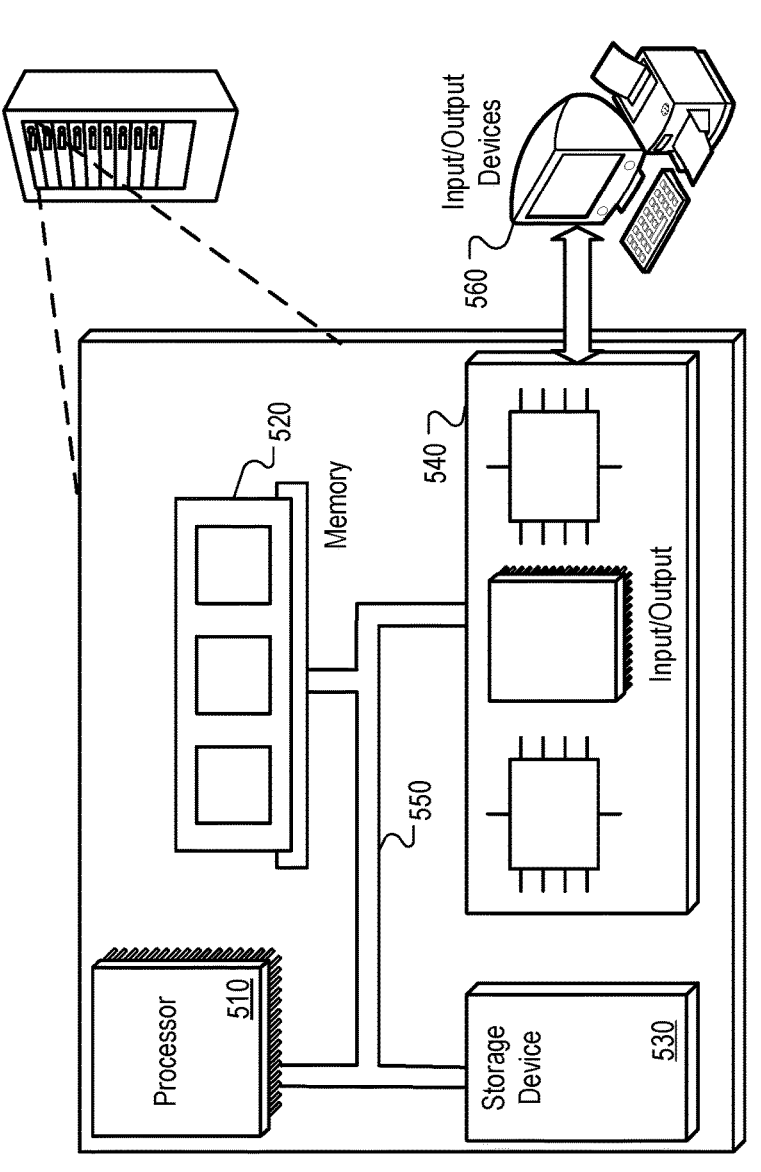

FIG. 5 is a block diagram of an example computer system.

Like reference numbers and designations in the various drawings indicate like elements.

DETAILED DESCRIPTION

This specification generally relates to generating quantization tables that are used during digital image compression of digital images. In some implementations, the techniques described in this specification generate one or more quantization tables that are used during encoding of a single digital image. In other implementations, the techniques described in this specification generate one or more quantization tables that are used during encoding of a set of digital images.

As described below and in more detail throughout this specification, a quantization table model is trained to generate one or more quantization tables that, when used to compress a digital image, produce an encoded digital image that minimizes a reduction in image quality (relative to the original image) and/or maintains the same or similar image classification as the original image. This model is trained using a set of training images. Each training image in the set of training images can be encoded using a differentiable encoder function (e.g., a differentiable JPEG encoder function) resulting in an encoded image. The model is trained to generate one or more quantization tables by optimizing a loss function that is a combination of (1) an image quality loss representing a difference in image quality between the training image and the encoded digital image, (2) a compression loss (also referred to as "compressibility loss") representing a reduction in size of the encoded image relative to the training image, and/or (3) a classification loss representing a difference in classification of the encoded digital image relative to the original image (each of these loss values/functions is further described in this specification).

Relatedly, and as also described in detail throughout this specification, the quantization table model can be trained to generate one or more quantization tables that, when used to compress a set of digital images, produces a corresponding set of encoded digital images that minimize a reduction in image quality (relative to the original set of images) and/or maintains the same or similar image classification as the original set of images. This model is trained using multiple sets of training images. Each training image in a particular set of training images is encoded using a differentiable encoder function (e.g., a differentiable JPEG encoder function) resulting in a JPEG encoded image. For each set of training images in the multiple sets of training images, the model computes an overall model loss, which is a combination of the image quality loss, the classification loss, and/or the compression loss for all the images in the particular set of training images (each of these losses is summarized above and described in greater detail throughout this specification). Thus, by optimizing the model using this overall model loss, the model generates one or more quantization tables that can be used for digital compression (also referred to as encoding) of an input set of training images.

These and additional features are described in greater detail with reference to FIGS. 1-5.

Figure 1:
FIG. 1 is a block diagram of an example JPEG compression apparatus.
Figure 1:
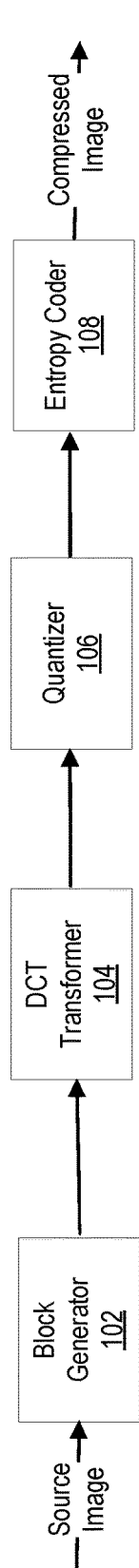

FIG. 1 is a block diagram of a conventional JPEG compression apparatus 100.

The JPEG compression apparatus 100 includes a block generator 102, a discrete cosine transformer (DCT) 104, a quantizer 106, and an entropy coder 108. The JPEG compression apparatus 100 accepts a source image, which it compresses into a JPEG compressed/encoded image. The compression algorithm employed by the JPEG compression apparatus is briefly summarized as follows.

The block generator 102 performs color conversion (and in some cases, an optional chroma downsampling) on the input source image, and then transforms the converted/downsampled image into blocks (e.g., 8×8 blocks) of image data. The DCT 104 (which can use, e.g., a forward discrete cosine function) converts the blocks of image data into corresponding blocks of DCT elements or coefficients.

The quantizer 106 performs compression by quantizing the 8×8 block of DCT coefficients using one or more quantization tables (e.g., luma, chroma tables). In general, JPEG quantization tables are fixed and are not adjusted for a particular image or a particular set of images. Each element of the quantization table is an integer value from one to 255, which specifies the step size of the quantizer for the corresponding DCT coefficient. In some implementations, the quantizer 106 performs a simple division operation between each DCT coefficient and the corresponding quantization table element. The lossiness/compression in the image generally occurs at least in part because the quantizer 106 rounds the resulting value to the nearest round number and thus, disregards any fractional remainder.

The entropy encoder 108 encodes (using, e.g., Huffman coding and Huffman tables) the quantized DCT coefficients based on their statistical characteristics to achieve additional lossless compression. The output of the entropy encoder is the JPEG compressed image data. This compressed image data can be packaged as part of a JPEG image file, which further includes at least a JPEG header, the one or more quantization tables, and the Huffman table (used during the Huffman coding).

Figure 2:
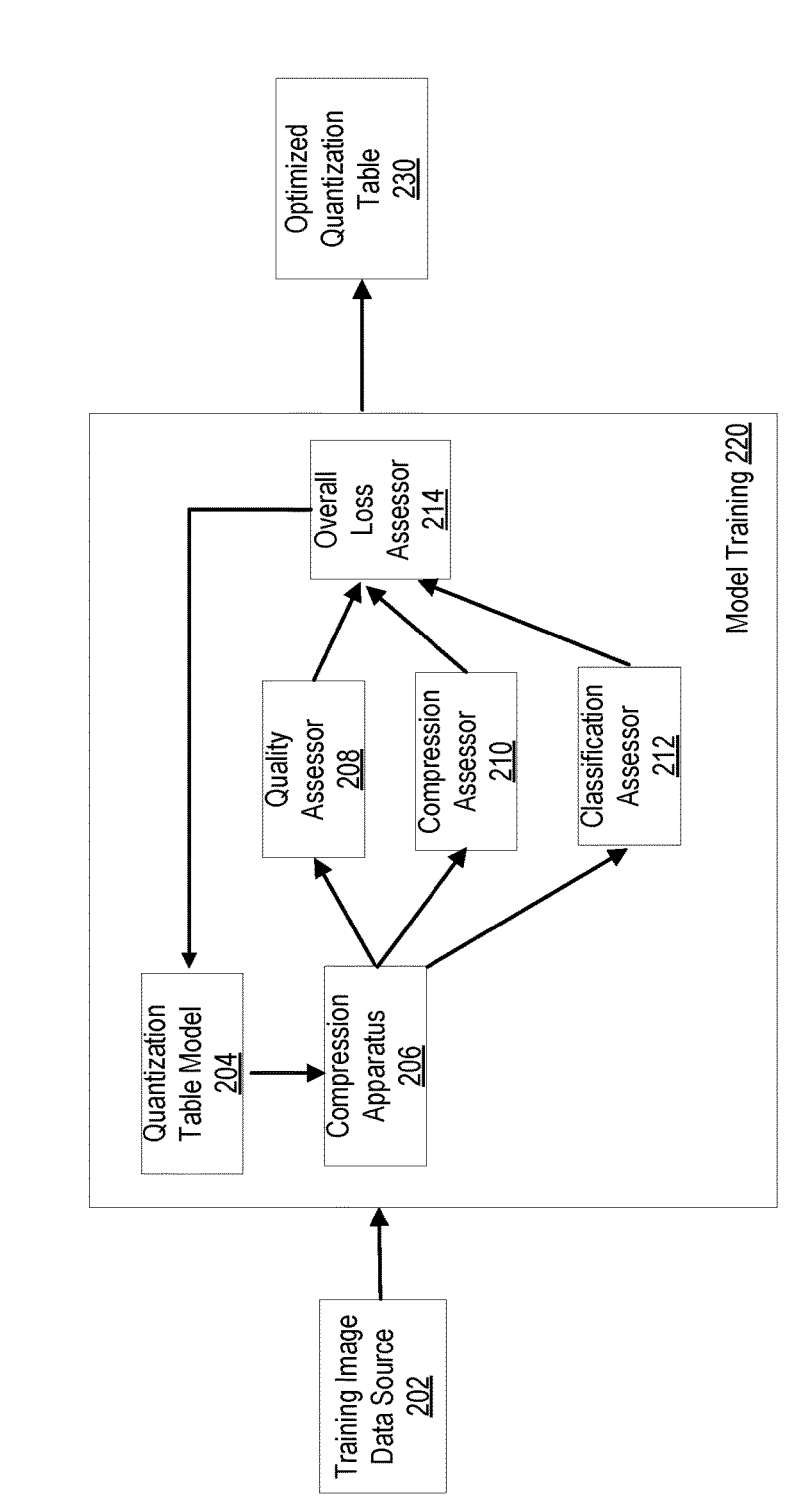
FIG. 2 is a block diagram of an example environment for generating quantization tables to be used during digital image compression of images.

FIG. 2 is a block diagram of an example environment 200 for generating quantization tables to be used during digital image compression of images.

The environment 200 uses a set of training images to train the quantization table model (which can be a machine learning model or another appropriate statistical model) to generate one or more quantization tables (e.g., JPEG luma and chroma quantization tables) that, when used to compress a single image or a set of images, produce encoded digital image(s) that minimize(s) a reduction in the image quality (relative to the original image(s)) and/or maintains the same or similar image classification as the original image(s). The structure and operations of the components of FIG. 2 are described with reference to FIGS. 3 and 4 below. Although this description of FIG. 2 and the following descriptions of FIGS. 3 and 4 are with reference to the JPEG standard, these descriptions are equally applicable to other compression standards that utilize quantization tables during image compression.

FIG. 3 is a flow diagram of an example process 300 for training a model to generate quantization tables to be used during digital image compression of a set of images. Operations of the process 300 can be performed by any appropriate device or system, e.g., any appropriate data processing apparatus or computing device. Operations of process 300 are described for illustration purposes using the components of the system described and depicted in FIGS. 1 and 2. Operations of the process 300 can also be implemented as instructions stored on a non-transitory computer readable medium. Execution of the instructions causes one or more data processing apparatus to perform operations of the process 300.

The process 300 obtains multiple sets of training images (at 302). In some implementations, the multiple set of training images can be obtained from any training image data source 202. This can include, for example, a computing device or data processing apparatus that stores digital images.

The model is trained by performing the operations 304-316, which are described below. The model is trained using these operations to generate one or more quantization tables (e.g., JPEG luma and chroma tables) that, when used to compress (using a JPEG compression standard or another appropriate compression standard that utilizes quantization tables) a set of digital images, produces a corresponding set of encoded digital images that minimize a loss/reduction in image quality (relative to the original set of images) and/or maintains the same or similar image classification as the original set of images. In the description of operations 304-316, the model is trained to generate a set of two quantization tables; however, the model may be trained to generate only one quantization table or more than two quantization tables (where appropriate).

These operations are performed for each set of training images in the multiple set of training images. In other words, these operations can be first performed for training images in a first set of training images, then these operations are performed for a second set of training images, and so on. Moreover, although operations 304 to 316 are illustratively described below with reference to training images of a particular set of training images, these operations are also performed with respect to other sets of training images.

The process 300 obtains, from a quantization table model 204, a current set of quantization tables (at 304). When the process 300 is initiated, the quantization table model 204, which can be implemented on any appropriate data processing apparatus, provides an initial set of quantization tables from a known set of quantization tables. For example, the initial set of quantization tables can be quantization tables that are known to have achieved a particular quality threshold (e.g., a particular PSNR value) for one or more digital images. As another example, the initial set of quantization tables can be any particular quantization tables selected from a set of known quantization tables (irrespective of whether that table has been previously associated with achieving a particular quality threshold or another appropriate metric). As another example, the initial set of quantization tables can be randomly initialized quantization tables. Once initialized, the quantization table generator 204 generates a set of quantization tables by optimizing a loss function as further described with reference to operations 316 and 318 below.

When training the model using a particular set of training images, the operations 306-312 are performed (iteratively or in parallel) for each training image in the particular set of training images. By performing steps 306-312 in parallel, the present techniques are able to process a large number of training images in shorter times and can make efficient use of a multiple processors and/or cores. Although operations 306 to 312 are illustratively described below with reference to a particular training image, these operations are performed with respect to each training image in the particular set of training images.

The process 300 generates, using the current set of quantization tables and for a particular training image in a particular set of training images, an encoded digital image (at 306). In some implementations, the compression apparatus 206 (which can be the same as the compression apparatus 100 in FIG. 1) generates a JPEG encoded digital image for the particular training image (e.g., as described with reference to FIG. 1). Thus, given an input image (x), a quality factor (q), and the current set of quantization tables (p), the compression apparatus 206 can use a differentiable JPEG encoder function (GO) to generate an encoded image $(C_q(x,p))$. The differentiable nature of the JPEG encoder function (GO) is obtained by replacing the quantization step-function curve (as used in convention JPEG encoder functions) with a smoothed polynomial (e.g., a third or second degree polynomial).

The process 300 determines an image quality loss based on pixel values of the encoded digital image and pixel values of the particular training image (at 308). In some implementations, the quality assessor 208 (which can be an appropriate data processing apparatus) computes the image quality loss, which is represented by an L2 (e.g., least square errors) loss based on a difference between the pixel values of the encoded digital image $(C_q(x,p))$ and the pixel values of the particular training image (x). This is represented using the equation: $\|C_q(x,p))-x\|^2$. Although an L2 loss function is used in the above image quality loss formulation, other types of losses may be used as well to represent the image quality loss.

The process 300 determines a compression loss that estimates a reduction in size of the encoded digital image relative to the training image (at 310). In some implementations, the compression assessor 210 (which can be an appropriate data processing apparatus) computes the compression loss using a function $B_q(x,p)$, which estimates the bit-rate consumed for JPEG compression of the training image (x) using a quality factor q and the current set of quantization tables (p). This function can be implemented using an entropy estimator (e.g., a neural network entropy estimator), which operates on the quantized DCT coefficients (as generated by the compression apparatus, as described with reference to FIG. 1) of the encoded digital image. Additionally, an additive independent and identically distributed (i.i.d) uniform noise can be added to these values to smooth their probability density function.

The process 300 determines an image classification loss (which may also be referred to as a classification loss) based on a predicted classification of the encoded digital image and the actual classification of the training image (at 312). In some implementations, the classification assessor 212 (which can be an appropriate data processing apparatus) computes a classification loss for the encoded digital image using the function $A[C_q(x,p),y]$, where $C_q(x,p)$ represents the encoded digital image and y is the label specifying the actual classification of the particular training image. The classification assessor 212 evaluates this function by inputting the encoded digital image into an image classification network that outputs a label specifying a predicted classification of the encoded digital image. The classification assessor computes the classification loss, which can, e.g., be a cross entropy loss (or another appropriate loss), by comparing the label specifying the predicted classification of the encoded digital image with the actual classification of the particular training image.

As described above, the operations 306-312 are performed for each training image in the particular set of training images. One or more of the resulting losses computed for all the training images in the particular set of training images are used in computing the overall loss of the model (as described below with reference to operation 314).

The process 300 determines an overall loss of the quantization table model based on the image quality loss, the compression loss, and the classification loss for all the training images in the particular set of training images (at 314). In some implementations, the losses computed for each training image are provided to an overall loss assessor 214 (which can be an appropriate data processing apparatus). The overall loss assessor 214 computes the overall loss of the model, which can be represented by the following function:

$$LOSS_{universal}(p) =$$

$$\sum_{q \in \Omega} \sum_{k=1}^{K} \{c_r B_q(x_k, p) + c_d \|C_q(x_k, p) - x_k\|_2^2 + c_c A[C_q(x_k, p), y_k]\}.$$

In the above function, the particular set of training images includes K images and the range of quality factors are represented by $q \ominus \Omega$. Accordingly, the overall loss $(Loss_{universal}(p))$ is a summation of the previously computed losses over the range of training images and the range of quality factors. As used in the above function, $c_r$, $c_d$, and $c_c$ are weight coefficients that can be used to calibrate the importance of associated compression loss, image quality, and classification losses, respectively.

Alternatively, in some implementations, the overall loss can be determined based only on the image quality loss and the compression loss. Accordingly, in such implementations, the classification loss for each training image is not computed or if computed, is not factored into the overall loss determination. Alternatively, the overall loss can be determined based only on the compression loss and the classification loss. Accordingly, in such implementations, the image quality loss for each training image is not computed or if computed, is not factored into the overall loss determination.

The process 300 updates the current set of quantization tables based on the overall loss of the model (at 316). In some implementations, the model updates the current set of quantization tables by minimizing the above overall loss function with respect to the current set of quantization tables via mini-batch gradient descent and back-propagation.

The model training continues with the next set of training images and the performance of the training operations described with reference to operations 306-316. The model training continues until a certain threshold is reached. For example, the model training can continue until one or more average measured values (e.g., bits-per-pixel and/or PSNR) of the encoded digital images corresponding to training images in a particular set of training images satisfies (e.g., meets or exceeds) one or more respective thresholds. Alternatively, the model training can continue until each set of training images has been used to train the model.

The process 300 obtains, after completing the training of the model, the current set of quantization tables that can be used for JPEG encoding of an input set of images (at 318).

After the training is completed, a set of digital images can be obtained and a corresponding set of JPEG encoded images can be generated by the compression apparatus 206 using the current set of quantization tables obtained upon completion of training of the machine learning model.

FIG. 4 is a flow diagram of an example process 400 for training a model to generate quantization tables to be used during digital image compression of a particular digital image. Operations of the process 400 can be performed by any appropriate device or system, e.g., any appropriate data processing apparatus or computing device. Operations of process 400 are described for illustration purposes using the components of the system described and depicted in FIGS. 1 and 2. Operations of the process 400 can also be implemented as instructions stored on a non-transitory computer readable medium. Execution of the instructions causes one or more data processing apparatus to perform operations of the process 400.

The process 400 obtains a plurality of training images (at 402). In some implementations, the plurality of training images can be obtained from any training image data source 202. This can include, for example, a computing device or data processing apparatus that stores digital images.

The quantization table model 204 is trained to generate a set of quantization tables that, when used to compress (using a JPEG compression standard or another appropriate compression standard that utilizes quantization tables) a particular image, produces a corresponding encoded digital image that minimize a reduction in the image quality (relative to the original image) and/or maintains the same or similar image classification as the original image. The model is trained by performing the operations 404-416, which are described below, for each training image in the plurality of training images. Although operations 404-416 are illustratively described below with reference to a single training image, these operations are performed with respect to each training image in the plurality of training images. In the description of operations 404-416, the model is trained to generate a set of two quantization tables; however, the model may be trained to generate only one quantization table or more than two quantization tables (where appropriate).

The process 400 generates, using a quantization table model 204, a current quantization table (at 404). As described with reference to the similar operation in FIG. 3, when the process 400 is initiated, the quantization table model 204 provides an initial set of quantization tables from a known set of quantization tables. Once initialized, a training image is input to the quantization table model 204, which generates the current set of quantization tables to be used in the current training iteration. As described below with reference to operations 414 and 416, the quantization table model 204 is trained to optimize the overall loss function.

The process 400 generates, using the current set of quantization tables and for a particular training image in a particular set of training images, an encoded digital image (at 406). As described with reference to the similar operation in FIG. 3, the compression apparatus 206 uses a differentiable JPEG encoder function to generate a JPEG encoded digital image ($C_q(x,p)$) for the particular training image (x).

The process 400 determines an image quality loss based on pixel values of the encoded digital image and pixel values of the particular training image (at 408). As described with reference to the similar operation in FIG. 3, the quality assessor 208 computes the image quality loss, which is represented by an L2 loss (or another appropriate loss function) based on a difference between the pixel values of the encoded digital image ($C_q(x,p)$) and the pixel values of the particular training image (x).

The process 400 determines a compression loss that estimates a reduction in size of the encoded digital image relative to the training (at 410). As described with reference to the similar operation in FIG. 3, the compression assessor 210 computes the compression loss using a function $B_q(x,p)$, which estimates the bit-rate consumed for JPEG compression of the training image (x) using a quality factor q and quantization tables (p).

The process 400 determines an image classification loss (which may also be referred to as a classification loss) based on a predicted classification of the encoded digital image and the actual classification of the training image (at 412). As described with reference to the similar operation in FIG. 3, the classification assessor 212 computes a classification loss for the encoded digital image using the function $A(C_q(x,p),y)$, where $C_q(x,p)$ represents the encoded digital image and y is the label specifying the actual classification of the particular training image. The classification assessor 212 evaluates this function by inputting the encoded digital image into an image classification network that outputs a label specifying a predicted classification of the encoded digital image. The classification assessor computes the classification loss, which can, e.g., be an L1 loss (or another appropriate loss function), by comparing the label specifying the predicted classification of the encoded digital image with the actual classification of the particular training image.

The process 400 determines an overall loss of the quantization table model based on the image quality loss, the compression loss, and the classification loss of the particular training image (at 414). As described with reference to the similar operation in FIG. 3, the losses computed for each training image are provided to the overall loss assessor 214. The overall loss assessor 214 computes the overall loss of the model, which can be represented by the following function:

$$\text{LOSS}_{image}(p) = c_r B_q(x, q) + c_d \|C_q(x, p) - x\|_2^2 + c_c A[C_q(x, p), y]$$

In the above function, $\text{LOSS}_{image}(p)$ represents the overall loss of the model and $c_r$, $c_d$, and $c_c$ are weight coefficients that can be used to calibrate the importance of associated compression loss, image quality, and classification losses, respectively.

Alternatively, in some implementations, the overall loss can be determined based only on the image quality loss and the compression loss. Accordingly, in such implementations, the classification loss for the training image is not computed or if computed, is not factored into the overall loss determination. Alternatively, the overall loss can be determined based only on the compression loss and the classification loss. Accordingly, in such implementations, the image quality loss for the training image is not computed or if computed, is not factored into the overall loss determination.

The process 400 updates the model 204 based on the overall loss of the model (at 416). In some implementations, the model 204 is updated by minimizing the above overall loss function with respect to the quantization tables via a mini-batch gradient descent and back-propagation.

The model training continues with the next training image and the performance of the training operations described with reference to operations 406-416. The model training can continue until a certain threshold is reached. For example, the model training can continue until one or more average measured values (e.g., bits-per-pixel and/or PSNR) of an encoded digital image corresponding to a particular training image satisfies (e.g., meets or exceeds) one or more respective thresholds. Alternatively, the model training can continue until each training image in the plurality of training images has been used to train the model.

After the training is completed, a digital image is obtained for digitally compressing this image. This digital image is input into the quantization table model 204, which in turn outputs a set of quantization table that can be used during the digital compression/JPEG encoding of the digital image. The compression apparatus 206 uses this quantization table output by the quantization table model 204 to generate a JPEG encoded image corresponding to the obtained digital image.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
obtaining a plurality of training images;
training a model to generate a quantization table for encoding an input image, wherein the training includes:
for each training image in the plurality of training images:
obtaining, using the model, a quantization table for encoding the training image;
generating, using the quantization table and for the training image, an encoded digital image;
determining (1) an image quality loss based on pixel values of the encoded digital image and pixel values of the training image and (2) a compression loss that estimates a reduction in size of the encoded digital image relative to the training image;
determining an image classification loss based on a predicted classification of the encoded digital image and an actual classification of the training image; and
determining an overall loss of the model by combining the image quality loss, the image classification loss, and the compression loss for the training image; and
updating the model based on the overall loss.

2. The computer implemented method of claim 1, further comprising:

obtaining an input image;

inputting the input image into the model;

obtaining, from the model and based on the input image, a quantization table for JPEG encoding of the input image; and generating, using the obtained quantization table, a JPEG encoded image corresponding to the input image.

3. A computer implemented method, comprising:

obtaining a plurality of sets of training images;

training a model to generate a quantization table for encoding an input set of images, wherein the training includes:

obtaining, using the model, a current quantization table;

for each set of training images in the plurality of sets of training images:

for each training image in the set of training images:

generating, using the current quantization table and for the training image, an encoded digital image;

determining (1) an image quality loss based on pixel values of the encoded digital image and pixel values of the training image and (2) a compression loss that estimates a reduction in size of the encoded digital image relative to the training image;

determining an image classification loss based on a predicted classification of the encoded digital image and an actual classification of the training image; and determining an overall loss of the model based on the image quality loss, the compression loss, and the image classification loss for all the training images in the set of training images; and updating, by the model and based on the overall loss, the current quantization table; and obtaining, after completing the training of the model, the current quantization table for encoding an input set of images.

4. The computer-implemented method of claim 3, wherein:

determining the image quality loss based on pixel values of the encoded digital image and pixel values of the training image includes determining a loss based on a difference between the pixel values of the encoded digital image and the pixel values of the training image; and determining the compression loss of the model is performed by a neural network entropy estimator that operates on quantized DCT coefficients of the encoded digital image.

5. The computer implemented method of claim 3, further comprising:

obtaining a set of digital images; and generating, using the current quantization table obtained upon completion of training of the model, a set of JPEG encoded images corresponding to the set of digital images.

6. A system, comprising:

one or more memory devices storing instructions; and one or more data processing apparatus that are configured to interact with the one or more memory devices, and upon execution of the instructions, perform operations including:

obtaining a plurality of training images;

training a model to generate a quantization table for encoding an input image, wherein the training includes:

for each training image in the plurality of training images:

obtaining, using the model, a quantization table for encoding the training image;

generating, using the quantization table and for the training image, an encoded digital image;

determining (1) an image quality loss based on pixel values of the encoded digital image and pixel values of the training image and (2) a compression loss that estimates a reduction in size of the encoded digital image relative to the training image;

determining an image classification loss based on a predicted classification of the encoded digital image and an actual classification of the training image; and determining an overall loss of the model by combining the image quality loss, the image classification loss, and the compression loss for the training image; and updating the model based on the overall loss.

7. The system of claim 6, wherein the one or more data processing apparatus are configured to perform operations further comprising:

obtaining an input image;

inputting the input image into the model;

obtaining, from the model and based on the input image, a quantization table for JPEG encoding of the input image; and generating, using the obtained quantization table, a JPEG encoded image corresponding to the input image.

8. A non-transitory computer readable medium storing instructions that, when executed by one or more data processing apparatus, cause the one or more data processing apparatus to perform operations comprising:

obtaining a plurality of training images;

training a model to generate a quantization table for encoding an input image, wherein the training includes:

for each training image in the plurality of training images:

obtaining, using the model, a quantization table for encoding the training image;

generating, using the quantization table and for the training image, an encoded digital image;

determining (1) an image quality loss based on pixel values of the encoded digital image and pixel values of the training image and (2) a compression loss that estimates a reduction in size of the encoded digital image relative to the training image;

determining an image classification loss based on a predicted classification of the encoded digital image and an actual classification of the training image; and determining an overall loss of the model by combining the image quality loss, the image classification loss, and the compression loss for the training image; and updating the model based on the overall loss.

9. The non-transitory computer readable medium of claim 8, wherein the instructions cause the one or more data processing apparatus to perform operations comprising:

obtaining an input image;

inputting the input image into the model;

obtaining, from the model and based on the input image, a quantization table for JPEG encoding of the input image; and generating, using the obtained quantization table, a JPEG encoded image corresponding to the input image.

10. A non-transitory computer readable medium storing instructions that, when executed by one or more data processing apparatus, cause the one or more data processing apparatus to perform operations comprising:

obtaining a plurality of sets of training images;

training a model to generate a quantization table for encoding an input set of images, wherein the training includes:

obtaining, using the model, a current quantization table;

for each set of training images in the plurality of sets of training images:

for each training image in the set of training images:

generating, using the current quantization table and for the training image, an encoded digital image;

determining (1) an image quality loss based on pixel values of the encoded digital image and pixel values of the training image and (2) a compression loss that estimates a reduction in size of the encoded digital image relative to the training image;

determining an image classification loss based on a predicted classification of the encoded digital image and an actual classification of the training image; and determining an overall loss of the model based on the image quality loss, the image classification loss, and the compression loss for all the training images in the set of training images; and updating, by the model and based on the overall loss, the current quantization table; and obtaining, after completing the training of the model, the current quantization table for encoding an input set of images.

11. The non-transitory computer readable medium of claim 10, wherein:

determining the image quality loss based on pixel values of the encoded digital image and pixel values of the training image includes determining a loss based on a difference between the pixel values of the encoded digital image and the pixel values of the training image; and determining the compression loss of the model is performed by a neural network entropy estimator that operates on quantized DCT coefficients of the encoded digital image.

\* \* \* \* \*